United States Patent [19]
Bonner

[11] 3,879,354
[45] Apr. 22, 1975

[54] POLYLACTAM POWDERS BY ANIONIC POLYMERIZATION

[75] Inventor: Eugene Frederick Bonner, Fanwood, N.J.

[73] Assignee: Union Carbide Corporation, New York, N.Y.

[22] Filed: June 26, 1973

[21] Appl. No.: 373,880

[52] U.S. Cl............................... 260/78 L; 260/78 P
[51] Int. Cl............................................. C08g 20/18
[58] Field of Search......................... 260/78 L, 78 P

[56] References Cited
UNITED STATES PATENTS

| | | |
|---|---|---|
| 3,017,391 | 1/1962 | Mottus et al..................... 260/78 L |
| 3,236,817 | 2/1966 | Zimmerman...................... 260/78 L |
| 3,461,107 | 8/1969 | Hayes................................ 260/78 L |

*Primary Examiner*—Lucille M. Phynes
*Attorney, Agent, or Firm*—James J. O'Connell

[57] ABSTRACT

Polylactams are produced in fine particulate form by anionically polymerizing lactam monomer in bulk at a temperature above the melting point of the monomer until the resulting polymer achieves a reduced viscosity of about 0.1 to 1.2, but before the reaction system attains a solid phase, and then quenching the reaction.

15 Claims, No Drawings

3,879,354

POLYLACTAM POWDERS BY ANIONIC POLYMERIZATION

BACKGROUND OF THE INVENTION

1. Field of the Invention

The invention relates to fine, particulate lactam polymers and to a process for preparing such materials.

2. Description of the Prior Art

Lactam polymers in particulate form are useful for various applications such as rotational molding, electrostatic spray coating, and fluidized bed coating. They can also be readily dry blended with adjuvants such as stabilizers, fillers and pigments. Various procedures have been developed for preparing such particulate materials. These procedures include pulverizing preformed polymer; or preparing the polymer in the presence of dispersing agent (U.S. Pat. No. 3,586,654), or precipitating preformed polymer from a solution thereof (N.A. Morzob et al., Plast. Massy, 1970, 174–5, Khimiya, Moscow, U.S.S.R.). Each of these processes has disadvantages in that they require either a plurality of steps and thus are relatively expensive to produce, or the use of preformed polymer having a high monomer content therein; or the product has a relatively low bulk density, or is not of uniform size, or has a relatively broad molecular weight distribution.

SUMMARY OF THE INVENTION

Fine particulate lactam polymers are prepared by anionically polymerizing lactam monomer in bulk at a temperature above the melting point of the lactam monomer until the resulting polymer achieves a reduced viscosity of about 0.1 to 1.2, but before the polymerization system reaches a solid phase, and then quenching the reaction.

An object of the present invention is to provide a simple process for the facile preparation of lactam polymers in fine particulate form.

Another object of the present invention is to provide lactam polymers in the form of fine particles of controllable size and shape.

Another object of the present invention is to provide lactam polymers in the form of fine particles having a controllable bulk density.

Another object of the present invention is to provide fine particulate lactam polymers having a relatively narrow molecular weight distribution.

A further object of the present invention is to provide polylactam resins from which unreacted lactam monomer can be readily removed.

DESCRIPTION OF THE PREFERRED EMBODIMENT

It has now been found that the objects of the present invention may be readily accomplished by anionically polymerizing lactam monomer in bulk at a temperature above the melting point of the lactam monomer until the polymer achieves a reduced viscosity of about 0.1 to 1.2, but before the reaction system achieves a solid state, and then quenching the reaction system.

The resulting polymers are thereby produced in fine particulate form and of uniform size and shape. Residual monomer is readily removed from such polymeric materials.

REDUCED VISCOSITY

The term reduced viscosity (R.V.) as it is used in connection with the present invention means the reduced viscosity of the lactam polymer as determined on a solution of the polymer in in m-cresol (0.1 gram of polymer/100 ml of solution) at 25°C. with a Cannon-Fenske viscometer as follows:

$$R.V. [(^{t}solution)-(^{t}solvent)]/[(^{t}solvent) \cdot (c)]$$

where:
$^{t}$solution = time in seconds required for the solution to travel a calibrated distance.
$^{t}$solvent = time in seconds required for the solvent to travel the same calibrated distance.
$c$ = concentration in grams/100 ml of solution (0.1)

The reduced viscosity is thus reported in units of deciliters per gram.

The use of the Cannon-Fenske viscometer for this purpose is described on page 38 of "Preparative Methods of Polymer Chemistry," by W.R. Sorenson and T.W. Campbell, Interscience Pub. Inc, New York, N.Y., 1961.

THE POLYMERIZATION SYSTEM

The essential components of the polymerization system of the present invention are the lactam monomer and one or more anionic lactam polymerization catalysts. One or more anionic lactam polymerization initiators or promoters may also be used to accelerate the reaction. The reaction may also be conducted in the presence of one or more adjuvant materials.

THE POLYMERIZATION REACTION

The polymerization reaction is conducted in bulk at a temperature which is above the melting point of the lactam being polymerized. The reaction is allowed to procede until the resulting polymer achieves a reduced viscosity of about 0.1 to 1.2 and preferably of about 0.3 to 1.0 but before the reaction system attains a solid phase.

By attaining a solid phase it is meant the point at which the resulting polymer is solid enough as to be grindable. The time required for this to occur will depend on various factors, i.e., the temperature of the reaction system; the particular monomer, catalyst and initiator, if any, used; and the concentration of catalyst and initiator employed. Generally, the polymerization reaction will proceed faster as the reaction temperature is raised, and/or as the concentration of catalyst is increased. The choice of lactam monomers will also have an effect on the polymerization time.

Depending on the variables involved, therefore, the polymerization time may vary from about 15 seconds to 12 hours. The preferred polymerization time is about 30 seconds to 60 minutes.

The bulk polymerization reaction is usually conducted at atmospheric pressure and at a temperature of about 70° to 260°C. The reaction can be conducted at a temperature which is at, or above or below the melting point of the resulting polymer, and which is, as noted above, above that of the monomer. The use of elevated pressure is not required for the polymerization reaction. The bulk polymerization reaction requires a polymerization period of about 30 seconds to 60 minutes at 75° to 200°C. depending on the lactam(s) employed, the catalyst and initiator concentration, and the polymerization temperature. The bulk polymerization reaction should be carried out under anhydrous conditions, i.e., in the presence of no more than about 0.2 weight per cent, and preferably no more than 0.03 weight per cent, of water or other active hydrogen containing by-product. Where a catalyst is used which would generate water or other active hydrogen containing by-products, such as the hydroxide, alkoxide or phenoxide catalysts, the excess amounts of such by-product materials should be removed before the polymerization reaction is conducted.

The polymerization is preferably carried out under an inert blanket of gas, such as, nitrogen, argon or helium in order to prevent oxidative degradation of the monomer and of destruction of the catalyst by moisture.

The reaction may be carried out batchwise or continuously.

Since the lactam monomers are normally solid materials at room temperatures, the bulk polymerization reactions may be carried out by various procedures. In one procedure, the lactam may be melted, and both the catalyst and the initiator admixed with it and then the reaction may be caused to proceed by bringing the reaction mixture to polymerization temperatures.

In another procedure, the catalyst and initiator may be dissolved separately in the lactam monomer, after which the two separate solutions may be combined to cause the polymerization to proceed at polymerization temperatures.

THE QUENCHING

The quenching step is for the purpose of stopping the polymerization reaction as quickly as possible. The quenching can be conducted in two general ways. One procedure involves adding a chemical to the reaction system in order to chemically inactivate the polymer or catalyst by dead stopping the reaction.

Such chemicals would be those containing active hydrogen groups such as water, carboxylic acids, alcohols, and amines. Water is preferably used in the form of steam.

Stoichimometric amounts of the active hydrogen containing quenching agents are used to dead stop the reaction, and to facilitate a rapid dead stopping of the reaction, the preferred amount of these active hydrogen containing quenching agents to be used is about 0.5 percent to about 500 percent by volume of the polymerization system.

The second technique involves a thermal quench of the polymerization system, that is, the temperature of the reaction system is quickly lowered to a temperature at which the polymerization reaction will not proceed. This lower temperature is usually about 50° to 130°C. below the temperature at which the polymerization is usually employed. The reaction temperature for an ε-caprolactam polymerization reaction system, for example, is about 75° to 205°C. and for a laurolactam polymerization system is about 150° to 205°C.

The thermal quench is preferably accomplished by adding a fluid quenching medium to the reaction system. Such fluid mediums would be chemically inert to the components of the reaction system and would include non-polar materials such as hydrocarbons such as cyclohexane, petroleum ether and benzene. The preferred amount of these inert fluid quenching agents to be used is about 10 to 500 percent by volume of the polymerization system.

The preferred quenching medium is a chemical one which contains active hydrogen groups and which is a solvent for the lactam monomer, but not a solvent for the polymer, such as water in the case of ε-caprolactam and isopropyl alcohol in the case of laurolactam, to facilitate removal of unreacted monomer from the polymer.

The thermal quench can also be accomplished by contacting the polymerization system with other cooling means such as by inserting cooling plates into the polymerization system or by pouring or casting the polymerization system onto a cold substrate, such as a cold metal plate.

If the reaction mass is cooled thermally, the particulate polymer may be recovered by dispersing the cooled mass in a solvent for the monomer, and then filtering off and drying the polymer particles.

THE FINE PARTICLES OF POLYMER

When the polymerization system is quenched in accordance with the process of the present invention the resulting polymers are recovered in the form of fine particles. These particles are of uniform size, i.e., in many cases ≥ 90 percent, and in some cases ≥ 98 percent, of the formed particles will have an average size of < 0.0017 inches (< about 43 microns) in diameter, or even less, i.e., < 30 microns. The particle size of the polymer that is formed is mainly dependent on the selection of the catalyst and initiator that is used in the reaction. The largest average size of the polymer particles that have been prepared by the process of the present invention, i.e., that size possessd by 90 percent of the polymer produced, however, is still relatively small, i.e., of the order of 177 to 420 microns. The size of the particles is determined by passing them through United States Standard Mesh Screens or by measuring the size with a Sharples Micromerograph (sold by Val-Del Company, 1339 E. Township Line Road, Norristown, Pa., 19403, U.S.A.)

The micromerograph is an instrument that determines particle size of powdered materials by air sedimentation means. This method is based on Stokes Law of Fall which relates the terminal velocity of particles falling through a gas to their size and density. In practice a sample of powder (about one-tenth gram, although this is not critical) is placed in a powder sampleholder. The holder is then clamped in place at the top of a sedimentation column. With this step, preparation is complete and the test may begin. Upon pressing a start button the sample is instantaneously deagglomerated and introduced as a cloud into the top of the sedimentation column. The particles settle onto the pan of an ultra-sensitive servo-electric balance. The accumulating weight is recorded on a strip chart, giving a graph of weight vs. time. By the use of a template incorporating Stokes Law of Fall, a continuous particle size distribution curve is obtained. (Stokes Law states that for particles of a given density, the rate at which a particle will fall through air is a definite function of its diameter. Particles of the same diameter will fall at the same rate and therefore, if the rate of fall of a particle of known density is measured, its diameter can be calculated.)

The extremely small size of the polymer particles greatly simplifies the removal of unreacted monomer therefrom since the particles can be washed in their recovered state without the need to melt the polymer.

The particle size of the polymer particles enables them to be used, as is, without the need for a grinding operation in adhesive applications and in various powder coating applications such as fluidized bed coating or electrostatic spray coating. The small size of the particles enables them to be readily admixed and blended directly with adjuvants and other polymers. Further, since the molecular weights (as measured by reduced viscosity) of the particulate polymers can be controlled to a significant degree, particulate polymers of various molecular weights can be provided for dry blending with each other to provide a wide variety of molecular weight distribution in a physical blend of the particulate polymers.

The polymer particles have a bulk density of about 6.5 to 20.5 lbs/ft$^3$. This high bulk density range is useful in that it allows the particulate polymers to be used, as is, without further processing, in extrustion molding systems for blown or slot cast film applications or for fiber applications.

The polymers made by the process of the present invention tend to have a relatively narrow molecular weight distribution, as indicated by their gel permeation curves (G.P.C.), and a relatively high order of crystallinity as indicated by the sharpness of their cooling curve peaks (as seen in their differential scanning calorimeter cell curves).

The recovery of the fine particles of the polymer is facilitated by precipitating the polymer particles from the reaction system by the use of about 0.5 to 500 percent, by volume of the system, of the chemical or thermal quenching agent.

THE LACTAM MONOMERS

The lactams which may be used according to the present invention are all those which are capable of being polymerized anionically and are preferably those lactam monomers which contain at least one ring group of the structure

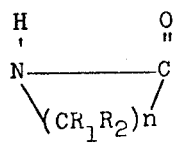

wherein $n$ is a whole number which is 3 to 15, and preferably 5 to 10, and $R_1$ and $R_2$ may be the same or different radicals on each carbon atom and may be H or $C_1$ to $C_{10}$ hydrocarbon.

Such lactams would include those having a single ring structure such as 2-pyrrolidone, 2-piperidone, 6-methyl-2-piperidone, ε-caprolactam, enantholactam, capryllactam, lauryllactam, decanolactam, undecanolactam, dodecanolactam, pentadecanolactam, hexadecanolactam, alkyl substituted caprolactams, aryl substituted lactams, and the like.

Lactams having a plurality of ring structures which may be used in the present invention include bislactams such as alkylene bis lactams of the formula:

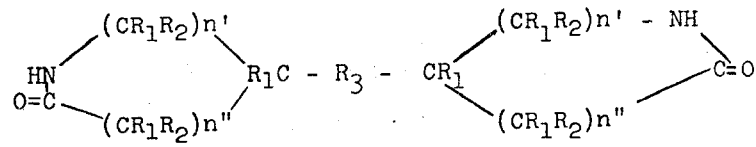

wherein $n'$ and $n''$ are each whole numbers such that $n'$ and $n''$ are each 2 to 14; $R_1$ and $R_2$ are as defined above; and $R_3$ may be $C_1$ to $C_4$ alkylene such as methylene, ethylene, propylene, and butylene; phenylene and substituted phenylene; O and S.

Other lactams having a plurality of ring structures include bicyclic lactams, such as those represented by the formulae:

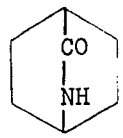 and 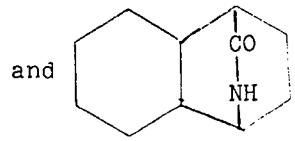

The lactams to be polymerized can be used individually or in any combination thereof.

THE ANIONIC POLYMERIZATION CATALYST

The catalysts which may be employed in the anionic polymerization reaction of the present invention include all anionic catalyst materials which may be employed in the anionic polymerization of lactams. The catalyst material is usually a salt of the lactam being polymerized although any other lactam may be used to form the catalyst. The salt is usually prepared by reacting the lactam with a strong base, i.e., a base strong enough to convert the lactam to its salt. Such bases would include alkali and alkaline earth metals or basic derivatives of such metals such as the hydroxides, oxides, alkoxides, phenoxides, hydrides, alkyls, aryls, amides, borohydrides and weak acid salts, i.e., acetates, carbonates, bicarbonates, benzoates, sulfites and bisulfites; Grignard reagents, and various other organometallic compounds. Such bases would include, therefore, metals such as lithium sodium, potassium, magnesium, calcium, strontium, barium, and aluminum and derivatives of such metals, such as lithium hydroxide, potassium hydroxide, magnesium hydroxide, calcium hydroxide, strontium hydroxide, barium hydroxide, lithium hydride, sodium hydride, sodium oxide, sodium methoxide, sodium phenoxide, sodium methyl, sodium ethyl, sodium phenyl, sodium naphthyl, and sodamide; Grignard reagents such as ethyl magnesium chloride, methyl magnesium bromide, and phenyl magnesium bromide; and other compounds such as zinc diethyl, triisopropyl aluminum, diisobutyl aluminum hydride, and lithium aluminum hydride.

About 0.2 to 20, and preferably 0.5 to 4, mole per cent of catalyst is used per mole of monomer being polymerized.

When the strong base is reacted with the lactam to form the catalyst a by-product is usually formed. For example, hydrogen is formed as a by-product when the metal hydrides or the elemental metals are used; water is formed as a by-product when metal hydroxides are used; alcohols are formed when alkoxides are used and water and $CO_2$ are formed when carbonate or bicarbonate salts are used. The preferred catalysts are those which result in the most readily removable by-products, since some of the by-products, such as $H_2O$, may have a deleterious effect on the polymerization reaction.

Where a catalyst is used which does produce an active hydrogen containing by-product such as water or an alcohol, such active-hydrogen containing by-products should be removed prior to the polymerization reaction, so as to avoid a premature dead-stopping of the reaction. Thus, the polymerization reaction should be conducted in the substantial absence of active-hydrogen containing compounds, until such time on one or more of such compounds may be intentionally added to the reaction system as a quenching means.

THE ANIONIC POLYMERIZATION INITIATORS

The initiators or promoters which may be employed in the anionic polymerization reaction of the present invention include all anionic initiator or promoter materials which may be employed in the anionic polymerization of lactams. Such initiators would include organic isocyanates, as disclosed in U.S. Pat. No. 3,028,369; compounds containing a tertiary nitrogen atom having at least two of the three N-substituents selected from the group consisting of carbonyl, thiocarbonyl, sulfonyl, nitroso, phosphinyl and thiophosphinyl radicals, as disclosed in U.S. Pat. Nos. 3,017,391 and 3,017,392; N,N'-di-, and N,N,N'-tri-substituted urea and thiourea compounds, as disclosed in U.S. Pat. No. 3,086,926; compounds containing at least one carbocyclic aromatic ring substituted with with at least one halogen atom which has been activated towards nucleophilic substitution as disclosed in Canadian Pat. No. 897,346 and in Belgian Pat. No. 764,527; N-Substituted nylon-1 compounds as disclosed in U.S. Pat. No. 3,681,473; Aromatic amides as disclosed in Belgian Pat. No. 765,261; thiolactones and polythiolactones as disclosed in U.S. Pat. Nos. 3,597,491 and 3,631,223; diacyl methane compounds disclosed in U.S. Pat. No. 3,696,075; N,N'-dialkyl azetidinedione compounds as disclosed in U.S. Pat. No. 3,671,500; Allophanoyl halide compounds as disclosed in U.S. Pat. No. 3,671,499; and substituted biuret compounds as disclosed in U.S. Pat. No. 3,671,501.

Such initiator compounds would include alkyl isocyanates such as methyl isocyanate; aryl isocyanates such as phenyl isocyanate; N-substituted imides such as the N-acyl lactams such as N-acetyl-ε-caprolactam; urea compounds such as 1,3-dimethyl urea, 1,3-dimethyl thiourea; activated halogen substituted aromatic compounds such as bis(p-chlorophenyl)sulfone, bis(p-fluorophenyl)sulfone, 2,6-dichloro-benzonitrile,4,4'-difluorobenzopheneone and 2,7-dichlorothiantharene tetraoxide; poly(N-phenyl isocyanate) and poly(N-butyl isocyanate); aromatic amides such as N-methyl-2,4,6-trichloroacetanilide, p-phenylsulfone-N-methyl acetanilide, N,N'-dimethyl-N,N'-diacetyl-4,4'-diamino diphenyl sulfone; thiocaprolactone, thiobutyrolactone and polythiocaprolactone; 3,3-di(2',7'-octadienyl)acetyl acetone and 3,3-diallyl acetyl acetone; N-methyl-N'-ethyl-azethidinedione and N-methyl-N'-tertiary butyl-azetidinedione; 2,4-dimethyl allophanoyl chloride, 2-methyl-4-(n-butyl)allophanoyl chloride, 2-ethyl-4-phenyl allophanoyl chloride and ethylene allophanoyl chloride; 1,3,5-trimethyl biuret, 1,3-dimethyl-5-(2'-methoxyethyl)biuret and 1-n-butyl-3-methyl-5-(m-trifluoromethylphenyl)biuret.

The initiators may be used individually or in combinations of each other. About 0.1 to 10 moles of initiator are employed per 100 moles of lactam monomer being polymerized.

The catalyst and the initiator are employed in a mole ratio to each other of about 2 to 200, and preferably of about 3 to 10.

ADJUVANTS

The polymerization reaction of the present invention may also be conducted in the presence of various types of adjuvant materials which are normally employed with the types of polymers prepared by the present invention, or the adjuvants may be added to the polymer after it is formed. Such adjuvant materials would include fillers, stabilizers, fibrous reinforcing agents such as asbestos and glass fiber, pigmenting materials and nucleating agents such as silica.

The particular polymer being prepared as well as the end use application will dictate the selection and quantity of the adjuvant to be employed therewith since it is the respective adjuvants for such polymers and such applications that are to be employed in the present invention. The adjuvants employed must be physically and chemically compatible with each of the other components of the monomer and polymer based compositions, under the prescribed operating conditions. As such, where they are present during the polymerization reaction, the adjuvants should not contain reactive groups which would interfere with the polymerization reactions, such as active hydrogen containing groups such as carboxyl, amino, mercaptan or hydroxyl groups.

The adjuvants would be used in amounts which would be effective for the intended purpose. Thus, a stabilizer would be used in a stabilizingly effective quantities therefor. For example, if a reinforcing filler were to be used, such filler should be used in such amounts as to provide the desired reinforcing effect.

The following examples are merely illustrative of the present invention and are not intended as a limitation upon the scope thereof.

EXAMPLE 1

A 1-liter three-neck ground glass flask was dried and set up with thermometer, chain stirrer, condenser, heating mantel, and the system was purged with dry inert gas ($N_2$). The flask was charged with 200 grams of ε-caprolactam. The ε-caprolactam was heated under purge to 160°C. to drive off residual moisture. To the molten ε-caprolactam under purge was added 2.93 grams of sodium hydride (as a 57 percent by weight dispersion in oil) (4.0 mole percent NaH based on the charged monomer). The reaction was continued at 160°C. after the evolution of hydrogen had ceased and the heating cycle to form polymer was allowed to continue for 6 hours at 160°C. when an increase in viscosity was observed. After the 6 hour heating period, the reaction was chemically quenched with cold water in 10 cc increments at first, followed by slowly adding 500 cc of water to cool the reaction and effect precipitation. A fine white precipitate was observed to form.

The reaction mixture was then filtered through a Buchner funnel. The finely divided particles ( ≥ 98 percent were < 30 micron, as measured by in a micromerograph were then washed three times with hot tap water. The particles from the final wash were slurried in acetone and filtered and allowed to dry at ambient temperature.

The yield of fine white particles had a bulk density of 9.95 lbs/ft$^3$. The reduced viscosity of the resulting polymer was found to be 0.5182 in meta-cresol at 25°C.

EXAMPLE 2

Example Of the Anionic Polymerization of ε-caprolactam in the presence of silica A dry three-necked ground glass 1-liter flask was set up on a heating mantle and fitted with a thermometer and serum stopper, chain stirrer, thermocouple, condenser, and purged with a dry inert gas ($N_2$).

To the dry purged flask there was charged 200 grams of ε-caprolactam which was then heated to the molten stage, and then to a temperature of 145°C. to drive off residual moisture. Two grams of dry Celite 223 (T.M.) diatomiceous earth, a form of colloidal $SiO_2$, was added to the molten ε-caprolactam. After purging the lactam for 10 minutes, 0.732 grams of NaH (1.0 mole percent, 57 percent by weight in oil dispersion) was then added to the system to form the sodium salt of ε-caprolactam. When hydrogen evolution ceased, 1.44 grams of dried (0.25 mole percent) dichlorodiphenyl sulfone (initiator) was then added to the mixture at temperature 157°C. When the exothermic polymerization reached a temperature of 185°C. (15 minutes), the solution was chemically quenched with 10 ml increments of cold tap water. An additional 700 ml of water was added to complete the quench step.

A white precipitate had formed as the mixture cooled about 100°C. The particles were filtered through a Buchner funnel with a No. 1 filter paper. The particles were then agitated and washed in 80°C. water, and filtered. The water wash process was repeated two times, followed by a final wash in 800 ml of acetone, filtering, and drying at ambient termperature. The total yield of product including two grams of charged Celite 223 (T.M.) diatomaceous earth was 32.0 grams. The yield of polymer was 15 percent based on the charged monomer. The bulk density of the particles was 4.14 lbs./ft³.

EXAMPLE 3

Use of Dichlorodiphenylsulfone Initiator and Water Quench

A 12 liter reaction flask was placed on a heating mantle and fitted with a chain stirrer, recording thermocouple, 125 ml addition funnel and condenser. Provisions were also made for a constant dry argon purge.

The flask was charged with 8,000 grams of ε-caprolactam which was then melted. The temperature was raised to 145°C. to drive off residual moisture. To the molten monomer was added 58.5 grams of NaH (as a 57 percent by weight dispersion in oil) (2.0 mole percent based on the monomer) which was stirred into the system until hydrogen evolution ceased. The temperature was maintained at 145°C.

At this point 115.5 grams of the initiator (4,4'-dichloro-diphenylsulfone) (0.5 mole percent based on the monomer was added, and timing began. After 8.75 minutes the temperature had fallen and risen again to 151°C. and the viscosity began to increase. The reaction was then quickly (in about 10 seconds) quenched with 125 ml of water followed by 4 liters of cold water. Very fine white particles began to precipitate immediately from the system, increasing in volume as the temperature decreased. The precipitate was filtered off.

The precipitate of very fine white particles was placed in a 12 liter flask. The flask was filled with cold tap water and stirred. This washing procedure was repeated a total of three times, each being followed by filtering in a Buchner funnel. The final wash was with acetone to allow for faster drying under ambient conditions.

The yield was 1745 grams (dry weight) which equalled 21.8 percent of the total monomer charged. The product contained 2.5 percent extractables by boiling water extraction (24 hours) in a soxhlet apparatus. The reduced viscosity of the polymer in meta-cresol at 25°C. was 0.7. The infrared spectra revealed that the product was Nylon-6. A microphotograph (100 X magnification of particles) showed that over 90 percent of the polymer particles were less than 30 microns in size. The powdery product had a bulk density of 10.15 lbs/ft³.

EXAMPLE 4

Use of an Amide initiator with a Thermal Quench

Into a 500 cc flask equipped with a magnetic stirrer and argon purge was added 200 grams of ε-caprolactam monomer. The caprolactam was heated to 150°C. to remove residual moisture, and then cooled to 140°C. To this system there was then added 0.732 gms. of NaH (1 mole percent based on monomer) to form the sodium salt of the ε-caprolactam which took approximately 5 minutes, i.e., until the evolution of $H_2$ ceases. The material in the flask was then cooled to about 75°C. At 75°C. the mixture was molten and easily stirred. To this mixture was added 1.4 grams (0.25 mole percent) of N,N'-diacetyl-N,N'-dimethyl-4,4'-diamino diphenyl sulfone (initiator). The mixture was then stirred for 2 minutes under argon purge, then poured into a metal can to thermally quench the reaction, and allowed to cool to room temperature as a solid crystalline mass.

The solid crystalline mass was ground to coarse lumps and added to about 300 ml of distilled water and stirred at room temperature. All the crystalline mass dissolved with the exception of a small quantity of very fine white powder. An additional 200 ml distilled water was used to wash down the sides of the flask. The white precipitate was filtered through a Buchner funnel. The volume of the filtrate was about 600 ml. The filtrate was then washed with 300 ml of isopropyl alcohol and allowed to dry at ambient temperature.

The resulting product was an extremely fine white powder. The yield was 14.6 grams (7.2 percent of total charge). The particles passed through a 325 mesh screen indicating that the particle diameter was less than 0.0017 inches or < 43.18 microns. A film was pressed from the powder by compression molding, the film was transparent but brittle, indicating that the polymer was of relatively low molecular weight.

EXAMPLE 5

(ε-Caprolactam polymerzation with Amide initiator

A 1-liter 3-neck ground neck flask was dried and set up with a thermometer, chain stirrer, condenser, and heating mantle, and the system was purged with dried argon gas. The flask was charged with 500 grams of ε-caprolactam. The ε-caprolactam was melted and heated under purge to 140°C. to drive off residual moisture. The stirrer was started, and to the molten E-caprolactam there was added 3.66 grams of sodium hydride (57 percent by weight oil dispersion) (2 mole percent based on the monomer). The reaction was continued until the evolution of hydrogen gas ceased indicating that the sodium caprolactam salt had completely formed. The mixture was cooled to a temperature of 105.5°C. At this temperature there was added 7 grams of the initiator (N,N'-diacetyl-N,N'-dimethyl 4,4'-diamino-diphenylsulfone),0.5 mole percent based on the monomer). The solution was stirred rapidly. In about 2 minutes the temperature began to rise to 107.5°C.. At this point the reaction was chemically quenched with 10 ml of distilled water followed by 500 cc of isopropanol. A white precipitate formed. The solution was cooled to 80°C. and filtered with a Buchner funnel. The polymer, a white powder, was recovered and dried at ambient temperatures. The yield of white powder was 141 grams (28 percent yield based on the monomer). The powder easily passed through a 325 mesh screen indicating that the particle size was less than 0.0017 in. or < 43.18 microns in diameter. A compression molded film made from the powder was brittle indicating that the product was relatively low in molecular weight. The reduced viscosity of the product was 0.28 in meta-cresol at 25°C. The polymer particles had a bulk density of 12.8 lbs/ft$^3$.

EXAMPLE 6

ε-Caprolactam polymerization with Amide initiator at 140°C

A 1 liter 3 neck ground glass flask was dried and set up with a thermometer, chain stirrer, condenser and heating mantle. The system was constantly purged with dry argon gas.

The flask was charged with 500 gms of ε-caprolactam. The ε-caprolactam was melted (68°C) and heated under purge to 140°C. to drive off residual moisture. Agitation was started at high speed and to the molten polymer was added 3.66 gms of sodium hydride as a 57 percent by weight oil dispersion (2 mole percent based on the monomer). The reaction was carried out until the evolution of hydrogen ceased (about 5 minutes). The temperature was maintained at 140°C. and 7.0 grams (0.5 mole percent) of the promoter (N,N'-diacetyl-N,N'-diacetyl-N,N'-dimethyl-4,4'-diamino diphenyl sulfone) was then added to the system. The solution was rapidly stirred. In 90 seconds the temperature rose to 150°C. At 150°C. the reaction was chemically quenched with 10 ml of water followed by 500 ml of isopropyl alcohol. A fine white precipitate was formed. The solution was cooled to 80°C. and filtered through a Buchner funnel. The white powder polymer product was recovered and dried at ambient temperature. The yield of white powder was 111 grams which was 22 percent of the charged monomer weight. The powder was pressed into a thin film on a compression molding press. The film was used to obtain an infrared survey spectra. The significant bands corresponded to that of an authentic specta of Nylon-6. The R.V. of the polymer in meta-cresol at 25°C. was 0.32. The polymer particles had a bulk density of 11.5 lbs/ft$^3$ and ≥ 98 percent of the particles had a particule size of < 30 microns as determined by a micromerograph.

EXAMPLE 7

ε-Caprolactam polymerization with 4,4'-dichlorodiphenylsulfone initiator at 140°C.

A 1 liter 3 neck flask was placed in a heating mantle and fitted with a chain stirrer, thermometer, and condenser. Provisions were also made for a constant dry argon gas purge.

The flask was charged with 500 grams of 68-caprolactam which was then melted therein. The temperature was then raised to 140°C. under constant argon purge to drive off residual moisture. To the molten monomer was added 3.66 grams (as a 57 percent by weight oil dispersion) of NaH (2.0 mole percent based on the monomer) and the system was constantly stirred until hydrogen evolution ceased. The temperature of the system was maintained at 140°C.

At this point 7.0 grams (0.5 mole percent) of the promoter, 4,4-dichlorodiphenylsulfone (a dry, white crystalline powder), was added and timing began. After six minutes the temperature of the system had dropped from 140°C. to 136°C. and the solution began to increase in viscosity. After 7.5 minutes the reaction was chemically quenched with 10 cc of water. The temperature of the system at this point was 135.75°C. and the viscosity had increased considerably.

The 10 cc of water was immediately followed by 500 ml of isopropyl alcohol which precipitated a fine white powder. The system was stirred vigorously until the temperature reached 80°C. This system was then filtered through a Buchner funnel and the polymer product, the powder, was dried under ambient conditions.

The yield was 63 grams (dry weight) of powdery polymer which equaled 12.6 percent of the total monomer charge. The R.V. of the polymer in meta-cresol at 25°C. was 0.62.

The product was then formed into pellets by cold compression of the powder. This procedure indicates that ordinary tableting machinery may be used to cold compress the powder into pellets. The pellets were extracted for 24 hours with boiling water in a soxhlet extractor and 4.4 percent of water solubles were removed. A Differential Scanning Calorimeter determination of the melting point of the polymer indicated that the melting point was 218°C. The melting point curve was quite sharp and the sharpness of the cooling curve peaks suggests a high order of crystallinity in the polymer. Over 90 percent of the polymer particles passed through a U.S. Standard 325 mesh screen indicating that their particle size was <43.18 microns in diameter.

EXAMPLE 8

ε-Caprolactam polymerization with Amide initiator at 140°C. to 150°C.

A 1 liter three neck flask was placed in a heating mantle and fitted with a chain stirrer, thermometer and condenser and provision were also made for a constant dry argon purge.

The flask was charged with 500 grams of ε-caprolactam which was then melted. The temperature of the molten monomer was then raised to 140°C. under constant agitation and constant argon purge to drive off residual moisture. To the molten monomer there was then added 3.66 grams (as a 57 percent by weight dispersion in oil) of sodium hydride (2.0 mole percent based on the monomer) and the system was constantly stirred until hydrogen evolution ceased. The temperature was kept constant at 140°C.

At this point 7.0 grams (0.5 mole percent) of the initiator, N,N'-diacetyl-N,N'-dimethyl-4,4'-diamino diphenyl sulfone, was added to the solution and timing began. After 1 minute the temperature of the system increased from 141°C. to 150°C. and the solution became very viscous. The reaCtion was then quickly chemically quenched with 10 cc of water followed by 500 ml of isopropyl alcohol which caused a white powder to precipitate out. The system was stirred vigorously until the temperature thereof reached 80°C. This system was then filtered in a Buchner funnel and the powdery polymeric product was dried under ambient conditions.

The yield of fine particles of polymer was 230 grams (dry weight) which equaled 46 percent of the total monomer charged. The reduced viscosity of the polymer was measured in meta-cresol at 25°C. and found to be 0.48. The particles had a bulk density of 16.82 lbs/ft$^3$, and over 90 percent by volume of the particles passed through a U.S. standard 325 mesh screen, and thus had a particle size of < 43.18 microns in diameter.

EXAMPLE 9

E-Caprolactam Polymerization With Toluene Diisocyanate Initiator at 140°C. to 150°C.

A 1 liter 3 neck dry flask was placed in a heating mantle and fitted with a chain stirrer, thermometer and condenser. Provisions were also made for constant dry argon purge.

The flask was charged with 500 grams of ε-caprolactam which was then melted. The temperature was then raised to 140°C. under constant argon purge to drive off residual moisture. To the molten monomer there was then added 1.83 grams (as a 50 percent by weight dispersion in oil) of sodium hydride (1.0 mole percent based on the monomer) and the resulting solution was constantly stirred until hydrogen evolution ceased. The temperature of the system was maintained at 140°C. At this point 5.35 cc (1.0 mole percent) of toluene diisocyante was injected into the solution and timing began. After 30 seconds the temperature of the solution increased from 140°C. to 150°C. and the viscosity of the solution began to increase. Ten cc of water was then injected into the solution to chemically quench the reaction. This was followed by 500 ml of isopropyl alcohol which cuased the polymer to precipitate as a white powder. The solution and precipitate were then stirred vigorously until the temperature reached 80°C. The solution was then filtered in a Buchner funnel and the white powdery polymer product was recovered and dried under ambient conditions.

The yield of fine particles was 255 grams (dry weight) which equaled 47 percent of total charge of ε-caprolactam. A 24 hour soxhlet extraction of the dried product with boiling water revealed that the product contained 2.3 percent by weight of water extractables. The reduced viscosity of the polymer in meta-cresol at 25°C. was 0.91. The bulk density of the powder was 15.6 lbs/ft$^3$. All the particles easily passed through a U.S. standard 35 mesh screen, and thus all had a particle size of <420 microns (0.0165 inches) in diameter.

EXAMPLE 10

ε-Caprolactam Polymerization With N-Acetyl-E-Caprolactam Initiator at 140°–150°C.

A dry 1 liter three neck flask was placed in a heating mantle and fitted with a chain stirrer, thermometer and condenser, and provisions were also made for a constant dry argon purge.

The flask was charged with 500 grams of ε-Caprolactam which was then melted. The temperature of the molten monomer was then raised to 140°C. under constant argon purge to drive off residual moisture. To the molten monomer there was then added 1.83 grams (as a 57 percent by weight dispersion) of NaH(1.0 mole percent based on the monomer) and the solution was maintained at 140°C. At this point 6.20 cc (1 mole percent of N-Acetyl-ε-caprolactam was injected into the solution and timing began. After 60 seconds the temperature of the solution increased from 140°C. to 150°C. and its viscosity began to increase. Ten milliliters of H$_2$O were then injected into the solution to chemically quench the reaction. This was followed by 500 ml of isopropyl alcohol which caused the polymer to precipitate as a white powder. The precipitate and solution were then stirred vigorously until the temperature of the system dropped to 80°C. The solution was filtered in a Buchner funnel and the powdery polymer was recovered and dried under ambient conditions.

The yield of fine white particles was 148 grams (dry weight) which equaled 29.6 percent of the total monomer charged. The reduced viscosity of the polymer in metacresol at 25°C. was 0.3. The particles had a bulk density of 16.4 lbs/ft$^3$. and over 90 percent of the particles passed through a U.S. standard 80 mesh screen, and thus had a particle size of <177 microns (0.007 inches) in diameter.

EXAMPLE 11

E-Caprolactam Polymerization with 4,4-dichlorodiphenyl Sulfone Initiator at 190°–205°C.

A 1 liter three neck flask was placed in a heating mantle and fitted with a chain stirrer, thermometer, 125 ml addition funnel and condenser; and provisions were also made for constant dry argon purge.

The flask was charge with 500 grams of ε-caprolactam and the monomer was then melted. The temperature of the solution was raised to 140°C. to drive off residual moisture. To the molten monomer there was then added 3.66 grams (as a 57 percent by weight dispersion in oil) of sodium hydride (2.0 mole percent based on the monomer) and the resulting solution was constantly stirred until hydrogen evolution ceased. The temperature of the solution was then brought up to 190°C. At this point 7.0 grams of the initiator, 4,4'-dichlorodiphenyl sulfone, was added and timing began. After 1 minute the temperature of the solution increased from 190°C. to 205°C. and the solution suddenly increased in viscosity. The reaction was then quickly chemically quenched with 125 cc of H$_2$O, and a white preoipitate formed. The solution and precipitate were stirred vigorously until the temperature dropped to 80°C. This system was then filtered in a Buchner funnel, and the recovered polymer, the white powder, was rewashed with isopropyl alcohol, filtered, rewashed with acetone, refiltered and allowed to dry under ambient conditions.

The yield of fine white particles was 175 grams (dry weight) which equaled about 34.7 percent of total charged ε-caprolactam. The reduced viscosity of the polymer in meta-cresol at 25°C. was 0.75.

EXAMPLE 12

ε-Caprolactam Polymerization with 4,4'-dichlorodiphenyl Sulfone Initiator at 140°C.

A 1 liter three neck flask was dried and placed in a heating mantle and fitted with a chain stirrer, thermometer, 125 ml addition funnel, and condenser; and provisions were also made for a constant dry argon purge.

The flask was charged with 500 grams of ε-caprolactam, and the monomer was then melted. The temperature of the system was then raised to 140°C. to drive off residual moisture. To the molten monomer there was then added 3.66 grams (as a 57 percent by weight dispersion in oil) of sodium hydride (2.0 mole percent based on the monomer) and the resulting solution was constantly stirred until hydrogen evolution ceased. The temperature remained constant at 140°C. At this point 7.0 grams (0.5 mole percent) of the initiator, 4,4'-dichlorodiphenyl sulfone, was added and timing began. After 10 minutes the temperature of the solution was dropped from 140°C. to 129°C. and the solution began to increase in viscosity. The reaction was quickly chemically quenched with 125 ml of $H_3O$, and a white precipitate formed. The solution and precipitate were stirred vigouously until the temperature dropped to 80°C. This solution was then filtered in a Buchner funnel, and the recovered white powdery polymer was rewashed with isopropyl alcohol, filtered, rewashed with acetone, refiltered and allowed to dry under ambient conditions.

The yield was 70 grams (dry weight) which equals 14 percent of the total monomer charged. The R.V. of the polymer in meta-cresol at 25°C. was 0.66. The particles had a bulk density of 6.6 lbs/ft$^3$, and over 90 percent of the particles passed through a U.S. standard 115 mesh screen, and thus had a particle size of <125 microns (0.0049 inches) in diameter.

EXAMPLE 13

Polymerization of Laurolactam

A 1 liter three neck flask was placed in a heating mantle and fitted with a chain stirrer, recording thermocouple and condenser and provisions were also made for a constant argon purge.

The flask was charged with 90 grams of laurolactam which was then melted at a temperature of 170°C. to drive off residual moisture. To the molten monomer there was then added 0.41 grams (as 57 percent by weight dispersion in oil) of NaH (2.0 mole percent based on the monomer) and the resulting solution was stirred until hydrogen evolution ceased. The temperature was maintained at 170°C. At this point 0.77 grams (0.5 mole percent based on the monomer) of the promoter, 4,4'-dichlorodiphenyl sulfone, was added and timing began. After 30 seconds, the temperature of the solution decreased from 170°C. to 168°C. and the solution increased slightly in viscosity. The reaction was immediately chemically quenched with 125 ml of isopropyl alcohol and extremely fine white particles began to precipitate out. The precipitate was recovered and washed with acetone and filtered with a Buchner funnel and allowed to dry under ambient conditions.

The yield of the fine particles of polymer was 4 grams (dry weight) or 4.4 percent of the charged monomer. A transparent film was made from the polymer by compression molding techniques and an infrared spectra for the polymer was obtained in the range of 2–15 microns. The product was Nylon–12.

EXAMPLE 14

Polymerization of ε-caprolactam in the presence of Polysulfone

Preparation of Polysulfone-Lactam Monomer Mixture

To 300 grams of melted ε-caprolactam there was added 60 grams of polysulfone resin (R.V. of 0.52 in dichloromethane at 25°C) under constant nitrogen purge. The mixture was heated to 200°C. for 4½ hours (until all the polysulfone resin was in solution). The resulting solution was then poured into a metal can under nitrogen and sealed. The can was set aside to cool in air.

Polymerization Procedure

A 1 liter flask was placed in a heating mantle and fitted under chain stirrer, recording thermocouple and condenser, and provisions were also made for a constant dry argon purge.

The flask was charged with 250 of ε-caprolactam and 250 grams of the 16.6 wt percent of polysulfone in caprolactam mixture prepared above. The temperature was raised to 145°C. to drive off residual moisture. To the molten solution there was then added 1.65 grams (as a 57 percent by weight dispersion in oil) of NaH (1.0 mole percent based on monomer) and the resulting solution was constantly stirred until hydrogen evolution ceased. The temperature was maintained at 145°C. At this point 3.3 grams (0.25 mole percent of the initiator, 4,4'-dichlorodiphenyl sulfone, was added and timing began. After 30 minutes the temperature of the solution had dropped and rose again to 158°C. and the viscosity began to increase. The reaction was quickly chemically quenched with 125 ml of $H_2O$. Fine white particles began to precipitate from the solution almost immediately, increasing in volume as the temperature dropped. The precipitate of discrete particles was placed in a 12 liter flask and washed several times in hot water, each washing followed with Buchner filtration.

The precipitate was then stirred in acetone and filtered. The powder was allowed to dry under ambient conditions. The total yield of fine particles of polymer was 94.1 grams (dry weight) which equals 18.8 percent of the total monomer and polysulfone resin charged. A film was made from the powder by compression molding. The film was somewhat brittle and opaque. The infrared spectrum of the film showed the characteristic features of polyamides in the bands associated with peptide linkage. These absorptions included bands at 3.03μ(N-H stretch), 6.06μ(amide I-associated with carbonyl stretching vibration) and amide II band at 5.45 due to N-H deformation vibration. In addition to the characteristic peptide linkage absorptions, there were very strong absorptions at the 11–12μ regions, (at 11.45μ, and 11.7μ) which are associated with the polysulfone polymer. The powdery product had a bulk density of 6.96lbs/ft$^3$, amd over 90 percent of the particles passed through a U.S. standard 80 mesh screen, and thus had a particle size of <177 microns (0.007 inches) in diameter.

EXAMPLE 15

Polymerization of ε-caprolactam in the presence of polystyrene

Preparation of Polystryene-Lactam Monomer Mizture 100 grams of ε-caprolactam was melted in a three neck flask under constant argon purge at a temperature of 200°C. and 10 grams of solid polystyrene, which had an average molecular weight of about 50,000 (Staudinger technique, in toluene), was stirred in until it was completely in solution. The mixture was then poured into a small can, sealed and allowed to cool.

Polymerization procedure

A 1 liter three neck flask was placed in a heating mantle and fitted with chain stirrer, recording thermocouple and condenser, and provisions were also made for a constant argon purge.

The flask was charged with 70 grams of ε-caprolactam and 70 grams of the polystyrene/ε-caprolactam mixture prepared above. The temperature was raised to 150°C. to drive off residual moisture. To the molten solution was added 1.02 grams (as a 57 percent by weight dispersion in oil) of NaH (2.0 mole percent based on the monomer) and the solution was stirred until hydrogen evolution ceased. The temperature was maintained at 150°C. At this point 2.01 grams of the initiator, 4,4'-dichlorodiphenyl sulfone, (0.5 mole percent based on the monomer) was added and timing began. After 8 minutes and 10 seconds the temperature of the solution had dropped to 146°C. and the viscosity began to increase. The reaction was them chemically quenched with 125 ml of $H_2O$ and a fine white precipitate began to appear as the temperature dropped.

The precipitate was washed several times in hot water after filtering with a Buchner funnel. A final wash was with isopropyl alcohol followed by filtration. The precipitate was allowed to dry under ambient conditios.

The yield of the fine particles was 24.4 grams (dry weght) which equaled 17.4 percent of the total monomer and polystyrene charged. A compression molded film was made from the powder for an infrared survey of the spectrum in the 2–15 μ range. The survey showed the usual bands associated with the peptide linkage, and in addition there was a strong band at 14.35 μ which is one of the most intense absorptions in polystyrene, The powdery product had a bulk density of 6.96lbs/ft$^3$ and over 90 percent of the particles passed through a U.S. standard 80 mesh screen, and thus had a particle size of <177 microns (0.0070 inches) in diameter.

EXAMPLE 16

Polymerization of E-caprolactam in the presence of Ionomer Resin

A 1 liter three neck flask was fitted with a chain stirrer, recording thermocouple and condenser with provision for constant argon purge The flask was placed in a heating mantle and charged with 500 grams of ε-caprolactam and 50 grams of an ionomer resin (90.8/ 9.2 mol percent) Ethylene-Acrylic Acid Copolymer wherein 80 percent of the COOH groups were converted to Sodium Salt). The temperature of the solution was then raised to 190°C. to drive off residual moisture and to solubilize the ionomer resin. To the molten solution there was then added 3.66 grams (as a 57 percent by weight dispersion in oil) of NaH (2.0 mole percent based on the monomer) and the solution was stirred until hydrogen evolution ceased. The temperature then dropped to 180°C.

At this point, 7.20 grams of the initiator, 4,4'-dichlorodiphenyl sulfone, (0.5 mole percent based on the monomer) was added and timing began. After 4.5 minutes the temperature of the solution had dropped to 175°C. and the viscosity began to increase. The reaction was then chemically quenched with 125 ml of $H_2O$ and a white precipitate began to form, increasing in quantity as the temperature decreased.

The precipitate of fine particles was washed several times in isopropyl alcohol, each washing followed by Buchner filtration. The final wash was with acetone and the precipitate was then recovered and allowed to dry under ambient conditions. The yield of fine particles of polymer was 70 gms. which was 12.7 percent based on the charged monomer and ionomer resin. The unreacted ionomer resin was recovered from the filtrate by treatment with sulfuric acid. The recovered ethylene-acrylic acid copolymer weight was 31.4 grams, indicating that 18.6 grams of the ionomer resin had combined with the polymerized ε-caprolactam. The infrared spectra of a compression molded film of the fine particles produced during the polymerization reaction of this invention showed a shoulder at 6.5 microns which was evidence of the presence of the ionomer resin in the discrete polymer particles. The particles had a bulk density of 7.55lbs/ft$^3$, and over 90 percent of the particles passed through a U.S. standard 80 mesh screen, and thus had a particle size of <177 microns (0.0070 inches) in diameter.

What is claimed is:

1. A process for producing lactam polymers in fine particulate form which comprises anionically polymerizing lactam monomer in bulk at a temperature above the melting point of the lactam monomer and then quenching the reaction before the polymerization system reaches a solid phase so as to thereby produce said polymers in fine particulate form, said quenching being conducted either with sufficient amounts of a chemical quenching means to dead stop the reaction or by thermally quenching the reaction to a temperature at which the polymerization will not proceed.

2. A process as in claim 1 in which the polymerization is conducted at a temperature of about 70° to 260°C.

3. A process as in claim 2 in which the polymerization is conducted within about 15 seconds to 12 hours.

4. A process as in claim 3 in which the quenching is accomplished within about 30 seconds to 60 minutes.

5. A process as in claim 4 in which the polymerization is conducted in the presence of anionic lactam polymerization catalyst and anionic lactam polymerization initiator.

6. A process as in claim 5 in which the polymerization reaction is thermally quenched.

7. A process as in claim 6 in which the polymerization reaction is chemically quenched.

8. A process as in claim 7 in which the quenching means is water.

9. A process as in claim 8 in which the lactam being polymerized comprises ε-caprolactam.

10. A process as in claim 8 in which the lactam being polymerized comprises laurolactam.

11. A process as in claim 6 in which the reaction is thermally quenched to a temperature which is about 50° to 130°C. below the temperature at which the polymerization is being conducted.

12. A process as in claim 11 in which the reaCtion is thermally quenched by adding a fluid quenching medium to the polymerization reaction system in an amount corresponding to about 10 to 500 percent by volume of the polymerization reaction system.

13. A process as in claim 7 in which the reaction is chemically quenched with stoichiometric quantities of a chemical quenching agent.

14. A process as in claim 13 in which said chemical quenching agent is an active hydrogen containing compound selected from the group consisting of water, carboxylic acids, alcohols and amines.

15. A process as in claim 7 in which the reaction is chemically quenched by adding the chemical quenching agent to the polymerization reaction system in an amount corresponding to about 0.5 to 500 percent by volume of the polymerization reaction system.

* * * * *